Patented Oct. 12, 1937

2,095,250

UNITED STATES PATENT OFFICE 2,095,250

SYNTHETIC COATING COMPOSITIONS

Albert J. Heberer, Maywood, and William R. Marshall, Chicago, Ill., assignors to The Glidden Company, Cleveland, Ohio, a corporation of Ohio No Drawing. Application January 7, 1936, Serial No. 57,962

2 Claims. (Cl. 91—68)

This invention relates to organic coating compositions for finishing various types of surface, and has particular reference to a new and novel synthetic resin finish prepared by the interaction of furfuryl alcohol, alone or in admixture with furfuraldehyde, and a dehydrating agent such as sulfuric acid. More particularly, it refers to a coating composition comprising a partially reacted furfuryl alcohol, dehydrating agent resin and a mutual solvent which inhibits further interaction of the resin-forming constituents so that the mixture may be safely stored.

It is well known that furfuryl alcohol alone, or in admixture with furfuraldehyde, can be reacted with dehydrating agents to form resinous condensation products. It is believed that the resinification occurs by the splitting off of water and resultant condensation into a condensed aldehyde, which recondenses until a molecule of resin-forming proportion is formed. The reaction occurs most rapidly at elevated temperatures, but with sufficient time, it occurs at ordinary room temperatures. For this reason, the mixture cannot be dissolved and allowed to stand, as resinification occurs in the solution, and the resin becomes insoluble and precipitates.

Because the final resin is substantially insoluble in practically all of the common solvents, and because the resin is extremely resistant to strong acids, we have felt that it would make an exceptional coating material for special purposes; but the fact that it could not be handled as a coating solution prevented its use.

Attempts were made to obtain the desired reaction by spraying the dehydrating agent over a surface coated with the alcohol or alcohol aldehyde mixture. This method was abandoned because of the difficulty of keeping the first coating on the work, and the necessity for heating the coating if speed of resinification were to be obtained.

Mixture of the two materials directly before application was also attempted, but similarly poor results were obtained, and the added complication of gelation of the mixture on overnight standing made this method much more undesirable even than the first method.

We have discovered that if the ingredients be reacted partially, to a stage where the reaction mass is still soluble, and the mass is then dissolved in a suitable solvent, that a satisfactory coating vehicle is obtained. This may be mixed before use with more dehydrating agent to obtain complete reaction, but the reaction is far enough along so that the coating has sufficient viscosity and adhesion to adhere properly to the work, and no heat is needed to obtain the final desired insoluble stage in a reasonable time.

Sulfuric acid is the preferred dehydrating agent, because of its miscibility with many of the common organic solvents in which the resin may be dissolved.

In a preferred form of our invention, we made a preparatory solution of concentrated acid (66° Baumé) in diacetone alcohol, using 4 liquid ounces of acid to 1 gallon of solvent. We then mixed

| | Ounces |
|---|---|
| Above solution | 1 |
| Furfuryl alcohol | 16 |
| Furfuraldehyde | 16 | and heated the mixture to 240° F. for an hour. The batch was allowed to cool, and was reduced with

| | Ounces |
|---|---|
| "Cellosolve" (ethylene glycol monoethyl ether) | 6 |
| Methyl isobutyl ketone | 6 |

The resultant solution was stable in the can, for at least a six-month period. Before use, we mixed it in the ratio of 8 parts by volume to 1 of the acid solution first made. A satisfactory coating could be obtained for more than 24 hours after mixing; the mixture had, however, gelled by the morning of the third day. The resultant film was unaffected by petroleum and coal tar naphthas, and by the ordinary ester and ketone lacquer solvents. Its resistance to acids was unusually good; it required more than 20 minutes for concentrated sulfuric acid to break through the film.

As another example of our invention, a solution of sulfuric acid was again made up, using 4 liquid ounces of concentrated acid to a mixture of ½ gallon denatured alcohol and ½ gallon butanol.

| | | |
|---|---|---|
| Furfuryl alcohol | gallons | 2⅜ |
| Furfuraldehyde | do | 5⅛ |
| Acid solution | liquid ounces | 9⅜ | were heated to 230–240° F. for about 90 minutes. There was then added, as a gelation inhibitor 15 liquid ounces tricresyl phosphate, and the resin was then dissolved in 4¼ gallons solvent naphtha. A separate solution was made by dissolving 2⅜ pounds 100 second R. S. nitrocellulose (30% alcohol) in 3½ gallons of amyl acetate and ¾ gallon of "Cellosolve", and the two solutions were mixed. The mixture was also very stable in the can (six months without signs of gelation); and on blending 8 parts of it with 1 part of the above acid solution, a coating material was obtained which could be sprayed for at least 24 hours after blending. This coating, in spite of its content of nitrocellulose, was as unaffected by nitrocellulose solvents as the first example; its acid resistance was somewhat improved.

Other dehydrating agents may be used to replace the sulfuric acid, although results are not quite as good. Among these agents which cause the condensation are zinc chloride, phosphorus pentoxide, and chromic acid.

It is important that the solvent include a percentage of some solvent which is a retarder or inhibitor of further condensation, in order to inhibit gelation in the can. Alcohols, esters, ketones, ethers and the aromatic hydrocarbons are satisfactory inhibitors, as are the common ester plasticizers such as dibutyl phthalate and tricresyl phosphate. The aliphatic hydrocarbons, however, are not satisfactory gelation inhibitors, and the use of large percentages of these solvents produces rapid gelation. The use of substantial percentages of the inhibiting solvents permits the carrying of the resin to a higher degree of condensation than if less solvent is used.

The partial resins can be used as coating compositions, but they do not then possess the desirable properties of substantial insolubility and resistance to acid, which are the desirable properties of the resin after reaction to insolubility.

We claim:

1. The method of producing a highly acid and solvent resistant coating on an object which comprises reacting a material of the class consisting of furfuryl alcohol and a mixture of furfural and furfuryl alcohol with a promoter for resinification to obtain a soluble resinous preliminary condensation product, dissolving the soluble resin in a solvent which retards further reaction, whereby a stable composition is obtained, adding to this composition just before use a further portion of promoter and applying the mixture to the surface whereby the reaction to the insoluble stage is completed on the object.

2. The method of claim 1 in which the resinification promoter is sulfuric acid.

ALBERT J. HEBERER.
WM. R. MARSHALL.